(12) United States Patent
Sugaya et al.

(10) Patent No.: US 7,027,428 B2
(45) Date of Patent: Apr. 11, 2006

(54) WIRELESS TRANSMITTING METHOD AND WIRELESS TRANSMITTER

(75) Inventors: Shigeru Sugaya, Kanagawa (JP); Hidemasa Yoshida, Chiba (JP)

(73) Assignee: Sony Corporation, Tokyo (JP)

(*) Notice: Subject to any disclaimer, the term of this patent is extended or adjusted under 35 U.S.C. 154(b) by 805 days.

(21) Appl. No.: 09/782,693

(22) Filed: Feb. 13, 2001

(65) Prior Publication Data

US 2001/0014087 A1 Aug. 16, 2001

(30) Foreign Application Priority Data

Feb. 16, 2000 (JP) ............................ P2000-038490

(51) Int. Cl.
- H04J 3/24 (2006.01)
- H04L 12/56 (2006.01)
- H04Q 7/00 (2006.01)
- G06F 11/00 (2006.01)

(52) U.S. Cl. ...................... 370/349; 370/392; 370/394; 370/471; 370/473; 714/758; 714/776

(58) Field of Classification Search ................ 370/394, 370/470, 473, 474, 477, 242, 347, 466, 395, 370/310.2, 401, 349, 392, 471; 714/758, 714/776

See application file for complete search history.

(56) References Cited

U.S. PATENT DOCUMENTS

| | | | |
|---|---|---|---|
| 5,684,791 A * | 11/1997 | Raychaudhuri et al. .. | 370/310.2 |
| 5,802,051 A * | 9/1998 | Petersen et al. ....... | 370/395.42 |
| 5,987,018 A * | 11/1999 | Freeburg et al. ......... | 370/310.2 |
| 5,999,535 A * | 12/1999 | Wang et al. ................ | 370/401 |
| 6,084,888 A * | 7/2000 | Watanabe et al. ........... | 370/473 |
| 6,243,395 B1 * | 6/2001 | Fujimori et al. ............ | 370/466 |
| 6,430,158 B1 * | 8/2002 | Sugita ........................ | 370/242 |
| 6,542,495 B1 * | 4/2003 | Sugita ........................ | 370/347 |
| 6,545,999 B1 * | 4/2003 | Sugita ........................ | 370/347 |

(Continued)

FOREIGN PATENT DOCUMENTS

EP 0497452 8/1992

(Continued)

OTHER PUBLICATIONS

Nagle, "Congestion Control in IP/TCP Internetworks", 8282 Computer Communications Review, 1995 (25): 61-65.

*Primary Examiner*—Alpus H. Hsu
(74) *Attorney, Agent, or Firm*—Jay H. Maioli

(57) ABSTRACT

A wireless transmitting method and a wireless transmitter capable of performing efficient wireless transmission depending on the length of asynchronous information involves forming a wireless network using a plurality of communicating devices to carry out asynchronous transmission of information and includes the steps of building a monopayload packet having one of predetermined information units of the information as a data payload, building a multipayload packet having a plurality of predetermined information units of the information as a data payload, and carrying out the asynchronous transmission by wireless packet obtained by optionally combining the monopayload packet with the multipayload packet depending on the length of the information to be asynchronously transmitted by wireless. Therefore, it is possible to carry out efficient asynchronous wireless transmission.

6 Claims, 18 Drawing Sheets

U.S. PATENT DOCUMENTS

| | | | |
|---|---|---|---|
| 6,553,038 B1 * | 4/2003 | Fukuda | 370/465 |
| 6,560,206 B1 * | 5/2003 | Naden et al. | 370/310.1 |
| 6,678,502 B1 * | 1/2004 | Sugaya et al. | 455/74.1 |
| 6,711,180 B1 * | 3/2004 | Delesalle et al. | 370/474 |
| 6,728,921 B1 * | 4/2004 | Bentall et al. | 714/758 |
| 6,907,048 B1 * | 6/2005 | Treadaway et al. | 370/474 |
| 6,931,009 B1 * | 8/2005 | Agarwal | 370/395.1 |

FOREIGN PATENT DOCUMENTS

| | | |
|---|---|---|
| EP | 0855820 | 7/1998 |
| EP | 0932270 | 7/1999 |
| EP | 1032165 | 8/2000 |
| EP | 1067740 | 1/2001 |
| WO | 0074344 | 12/2000 |

* cited by examiner

FIG. 9

| Packet Use | Packet Name | Packet ID | Packet Contents | Remarks |
|---|---|---|---|---|
| Access Control Packet | Non-payload Packet | 0000 | Header | Control Information Network ID |
| Data Packet | Monopayload Packet | 0001 | Header+Data Unit×1 | Fragment Sequence Number Contents Length |
| | Multipayload Packet | 0010 | Header+Data Unit×2 | |
| | | 0011 | Header+Data Unit×3 | |
| | | 0100 | Header+Data Unit×4 | |
| | | 0101 | Header+Data Unit×6 | |
| | | 0110 | Header+Data Unit×8 | |
| | | 0111 | Header+Data Unit×N | +Payload Length |

WIRELESS TRANSMITTING METHOD AND WIRELESS TRANSMITTER

BACKGROUND OF THE INVENTION

1. Field of the Invention

The present invention relates to a wireless transmitting method and a wireless transmitter which are preferably applied to the case where a wireless signal is transmitted to various devices to form a local area network (LAN) between a plurality of devices, for example.

2. Description of the Related Art

As a packet structure for asynchronous transmission, a method of distinguishing between a header information portion and a data payload portion to build one packet is disclosed in Japanese Laid-Open Patent Publication No. H11-215136.

According to the above invention, only a portion included in common header information is first decoded before all the packets for asynchronous transmission are decoded to make decidable of the presence to make decidable of contents of the data payload portion following the header portion.

Furthermore, there has also been proposed a method of carrying out transmission by including length information of the data payload portion in the common header information portion.

FIG. 16 is a diagram showing an example of a wireless transmission frame structure according to a conventional method. Although a frame is herein defined for convenience, such a frame structure is not always required. In the drawing, a transmission frame arriving in a fixed transmission frame cycle 160 is defined, and a management information transmitting region 161 and an information transmitting region 162 are provided therein.

A down management information transmission interval (DM Down Link Management) 163 for notifying a frame cycle and network common information is provided at the head of the frame. Subsequently, a station sync transmitting interval (UM: Up Link Management) 164 is provided. There has been supposed such a structure that DM forms a down management interval (frame synchronizing area) including frame synchronizing information, and UM forms a station synchronizing interval (node synchronizing area), which are assigned respectively to each communicating station forming a network to prevent the conflict of transmission by a plurality of communicating stations.

For example, by receiving all portions other than a transmitting portion of a local station in the station synchronizing interval, a connection link state with a communicating station present around the local station can be grasped.

Moreover, by reporting to each other the status of the connection link in the information transmitted on the station synchronizing interval of the local station in the next frame, the connection status of the network can be grasped by each communicating station.

The information transmitting region 162 consists of a band reservation transmitting region 165 to be set if necessary and an asynchronous transmitting area 166 in the other portion.

In other words, if the band reservation transmission is not required, all the information transmitting region can be transmitted as asynchronous transmitting area.

By taking such a frame structure, isochronous (Isochronous) transmission defined by e.g. IEEE 1394, is carried out in the band reservation transmitting area and asynchronous transmission or the like is carried out in the asynchronous transmitting area.

There has been proposed a first conventional wireless transmitting method in which when a header information portion to be decoded earlier including information about the presence of a data payload portion is transmitted succeeding data payload portions are partitioned by the fixed length for transmission, whereby transmission control can be carried out by the fixed-length block unit, so that retransmission control in a wireless interval can easily be processed by the fixed unit.

By partitioning one packet by the fixed length unit in this manner, processing to decode in a communicating station on the receiving side can be simplified.

FIG. 17 is a diagram showing an example of a wireless transmission packet structure according to the first conventional method. In FIG. 17, there is shown an example of a packet structure in which information is divided by the predetermined transmission data payload 172 to each of which a preamble 170 and header information 171 are added for transmission according to the first conventional method.

In the drawing, an information string to be transmitted is divided by the fixed-length data payload 172 thereby making a packet to be built. In other words, there are a plurality of preambles 170 and the header information 171, so that if the preamble 170 is great, a transmission efficiency will deteriorate.

A second conventional wireless transmitting method has been proposed in which, when the header information portion to be decoded earlier including size (length) information of the data payload portion is transmitted, length information of the data payload portion can be specified in advance, thereby making it possible to continuously carry out processings to transmit and receive one packet for asynchronous transmission.

According to this method, there has been an advantage that the asynchronous transmission packet can be built without carrying out a fragment processing of a transmission packet.

Moreover, FIG. 18 is a diagram showing an example of a wireless transmission packet structure according to the second conventional method. In FIG. 18, there is shown an example of the structure of a packet to be transmitted, in which an information string to be transmitted is not divided but a data payload 182 is formed as one block, to which a preamble 180 and header information 181 are added according to the second conventional method.

As shown in the drawing, the processing to divide by the unit is not required as described above but the header information 181 including information on the packet length should be transmitted. This means that, a long packet includes only one preamble 180 and only one header information 181, so that missing no information to be received.

SUMMARY OF THE INVENTION

In the first conventional wireless transmitting method described above, however, an overhead is added to each packet and therefore, in the case where an asynchronous transmission packet having a great amount of information content and length is to be transmitted, the overhead will increase and so a transmission efficiency will deteriorate disadvantageously.

For example, in the case where a redundant synchronizing preamble is utilized in multicarrier transmission, there is a disadvantage that an information transmission efficiency will remarkably deteriorate if a synchronizing preamble having a length equivalent to a symbol length of the data payload portion is added.

In the first conventional transmitting method, furthermore, a fragment processing is required to build a packet in a communicating station on the transmitting side and a work for assembling the packet is also required on the receiving side. Thus, there is a disadvantage that it makes the building difficult in respect of executing asynchronous transmission at high speed.

In the second conventional wireless transmitting method, moreover, the transmission control is carried out collectively on an asynchronous transmission packet having a great amount of information. Therefore, in the case where a transmission error is made and retransmission is to be performed, it is necessary to carry out the transmission again from the beginning using the long asynchronous transmission packet. Thus, there has been a disadvantage that the efficiency is deteriorated in the wireless transmission whose state of transmission path changes.

Moreover, in the case where one synchronizing preamble is to be added to one asynchronous transmission packet for transmission, if the synchronous preamble is missed caught by the communicating station on the receiving side, not only information cannot be decoded but also transmission path is occupied for a long time due to the useless transmission.

Furthermore, if the length information cannot be decoded from the header information in the communicating station on the receiving side, the length of the whole asynchronous packet cannot be decided. Therefore, there has been a disadvantage not only that not only the information cannot be decoded but also the transmission path is occupied for a long time due to useless transmission.

Alternatively, in the second conventional wireless transmitting method, when a frame cycle is defined as a fixed cycle (time), transmission exceeding the frame cycle cannot be carried out. Therefore, there has been a disadvantage that information transmission is interrupted, resulting in poor throughput.

In view of the above-mentioned respects, the present invention has been made and has an object to provide a wireless transmitting method and a wireless transmitter which is capable of performing wireless transmission having a high efficiency depending on the length of asynchronous information.

BRIEF DESCRIPTION OF THE DRAWINGS

FIG. 7A shows header information of an access control packet; FIG. 7B shows common header information; and FIG. 7C shows header information added to a data packet.

FIG. 9 is a diagram showing an example of packet identification by a packet ID of common header information;

DESCRIPTION OF THE PREFERRED EMBODIMENTS

Figure 1:
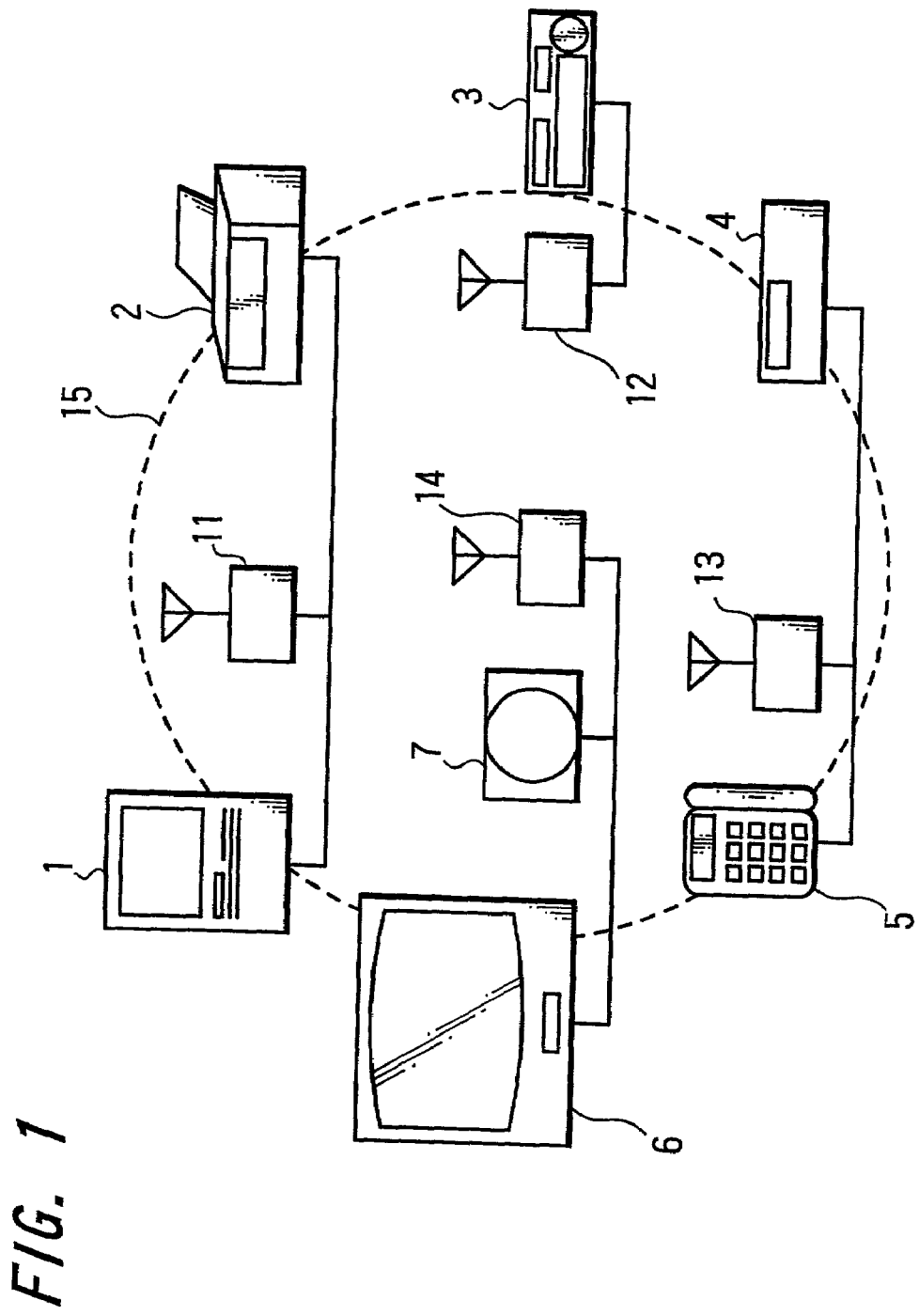
FIG. 1 is a diagram showing an example of the structure of a wireless network to which a wireless transmitting method according to an embodiment of the present invention is applied.

In a wireless transmitting method according to the present invention, a monopayload packet obtained by packing one of predetermined information units into a data payload, and besides, a multipayload packet obtained by packing a plurality of predetermined information units into a data payload are prepared as the asynchronous transmission packet, and they are combined to build a wireless packet for wireless transmission.

In the wireless transmitting method according to the present invention, moreover, the corresponding packet is divided into a header information portion and a data payload portion to build one wireless packet for transmitting information.

In the wireless transmitting method according to the present invention, furthermore, predetermined preambles and header information common to each packet are added to the respectively payload packets. The header information is for deciding the state of succeeding data payloads and discriminating the presence of the data payload portion, whether it is and the type of data payload, and a monopayload packet or a multipayload packet.

In other words, when there is a data payload, processing to receive the data payload for a first information unit is first carried out after the header information. Then, if it is decided that a plurality of data payloads continue, the reception processing of and after a second information unit is carried out.

In the wireless transmitting method according to the present invention, moreover, error detection information is added in each predetermined information unit and retransmission control is carried out in each information unit for the multipayload packet.

In the wireless transmitting method according to the present invention, furthermore, the sequence number to be added to the multipayload packet is added in each predetermined information unit and the number of units collected into this packet is incremented to build the next packet.

In the wireless transmitting method according to the present invention, moreover, the retransmission control in each predetermined information unit is carried out using the sequence number given to each predetermined information unit.

In the wireless transmitting method according to the present invention, furthermore, a non-payload packet which can be decided by only the common header information having no data payload portion is used as a packet employed for the access control information sent from a control station to each communicating station in the wireless network.

Also, in the wireless transmitter according to the present invention, the asynchronous information is transmitted using the wireless packet.

According to the present invention, unlike the first conventional wireless transmitting method, it is not necessary to add the preamble and the header information to each packet fragmented by the predetermined information unit, and it is possible to add the preamble and header information to a plurality of information units and prevent transmission efficiency from being lowered.

Moreover, according to the present invention, long asynchronous information can be fragmented and preamble and header information can be suitably added appropriately. Therefore, unlike the a second conventional wireless transmitting method in which only one preamble and one header information is added to the long asynchronous information, it is possible to utilize a transmission path more flexibly and carry out the retransmission control by the predetermined information unit, resulting in better efficiency.

In a wireless transmitting method according to an embodiment of the present invention, a monopayload packet including one payload of a predetermined size and a multipayload packet including a plurality of payloads are prepared in a wireless network system, and header information for wireless transmission control is added thereto to carry out asynchronous transmission. Moreover, a packet including only header information is utilized for the transmission control.

The present embodiment will be described below. FIG. 1 is a diagram showing an example of the structure of a network system to which a wireless transmitting method according to an embodiment of the present invention is applied.

For example, as shown in FIG. 1, a personal computer 1 and a printer 2 are connected to a wireless transmitter 11 through a cable or the like. Moreover, a VTR (video tape recorder) 3 is also connected to a wireless transmitter 12 through a cable or the like. Furthermore, a telephone set 5 and a set top box 4 are also connected to a wireless transmitter 13 through a cable or the like. Similarly, a television receiver 6 and a game apparatus 7 are connected to a wireless transmitter 14 through a cable or the like. In this way, each device is connected to each wireless transmitter, and each wireless transmitter constitutes a network 15.

Figure 2:
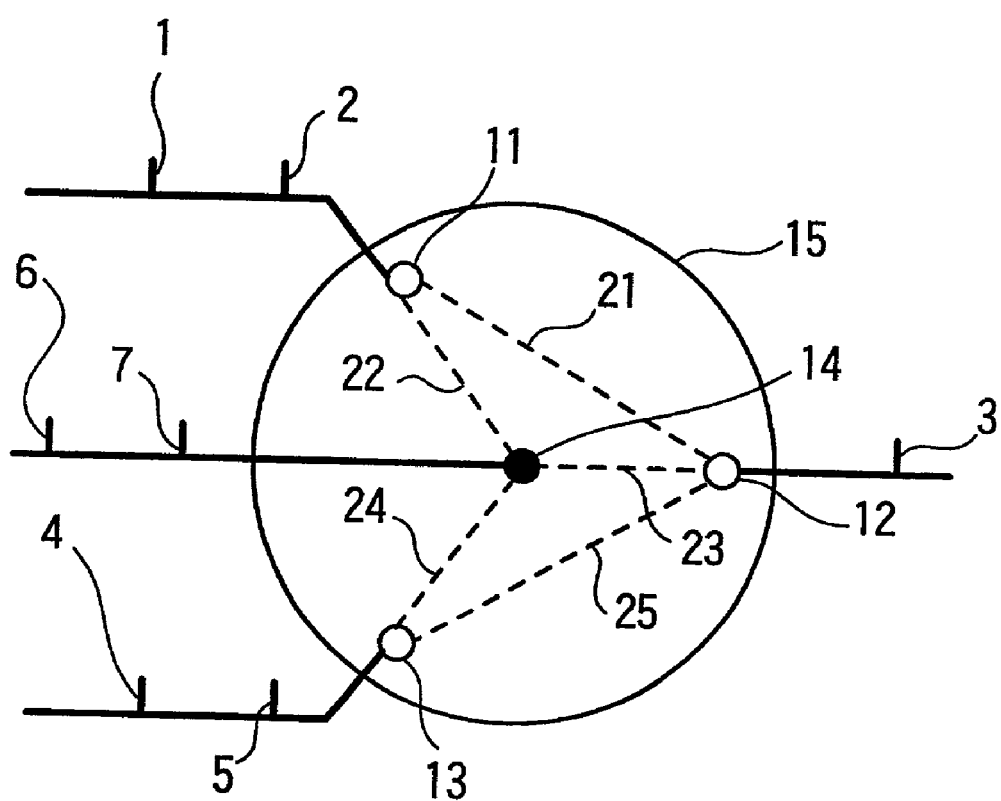
FIG. 2 is a diagram schematically showing a mode of network connection.

FIG. 2 is a diagram schematically showing a mode of connection of a network.

In FIG. 2, the wireless network 15 constituted by the wireless transmitters 11, 12 and 13 of terminal communicating stations shown by white circles is formed center around the wireless transmitter 14 of a control station as the center shown by a black circle. The personal computer 1 and the printer output device 2 are connected to the wireless transmitter 11 as shown by a solid line. Moreover, the VTR 3 is also connected to the wireless transmitter 12 as shown by a solid line. Furthermore, the telephone set 5 and the set top box 4 are also connected to the wireless transmitter 13 as shown by a solid line. Similarly, the television receiver 6 and the game apparatus 7 are connected to the wireless transmitter 14 as shown by a solid line.

In the wireless network 15, the control station 14 can carry out communication with all the communicating stations 11 to 13 on the network 15 through channels 22 to 24 shown by a dotted line.

However, direct transmission to the distant communicating station 13 cannot be carried out in the communicating station 11, whereas communication with the control station 14 and the communicating station 12 on the network 15 can be carried out through the channels 22 and 21 shown by a dotted line.

Also, the communicating station 12 can carry out communication with the control station 14 and the communicating stations 11 and 13 on the network 15 through the channels 23, 21 and 25 shown by a dotted line.

Although direct transmission to the distant communicating station 11 cannot be carried out by the communicating station 13, communication with the control station 14 and the communicating station 12 on the network 15 can be carried out through the channels 24 and 25 shown by a dotted line.

Figure 3:
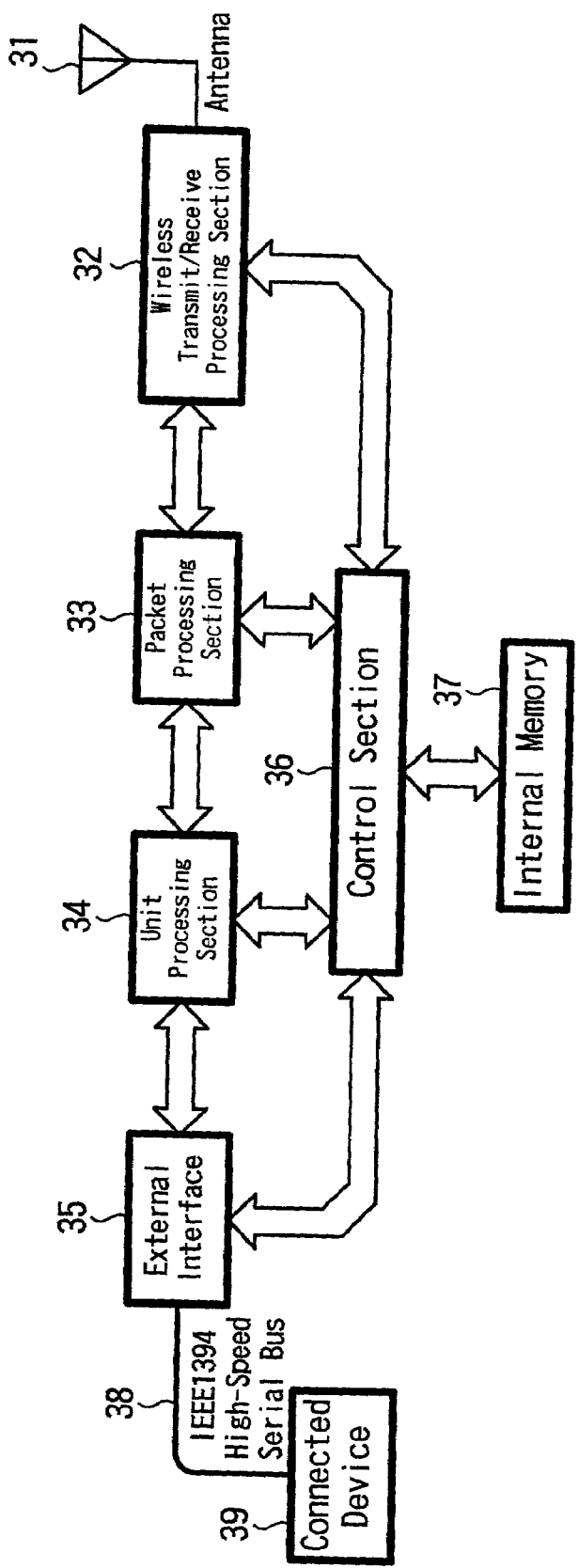
FIG. 3 is a diagram showing an example of the structure of a wireless transmitter forming each communicating station.

FIG. 3 shows an example of the structure of each of the wireless transmitters 11 to 14 forming each communicating station.

In this example, the wireless transmitters 11 to 14 basically have a common structure and comprise an antenna 31 for carrying out transmission and reception and a wireless transmit/receive processing section 32 connected to the antenna 31 for carrying out a wireless transmission processing and a wireless reception processing so as to enable wireless transmission with other transmitter to be performed.

In this case, for example, a transmitting method using a multicarrier signal which is termed OFDM (orthogonal Frequency Division Multiplex) method is applied to a transmitting method in which transmission and reception are carried out by the wireless transmit/receive processing section 32 according to the present embodiment, and a very high frequency band (for example, 5 GHz band) is used for a frequency to be utilized for the transmission and reception.

In the present embodiment, a comparatively low output is set as a transmission output. For example, when used indoors, the output is set so that wireless transmission can be carried out at a comparatively short distance from approximately several meters to several ten meters.

The wireless transmit/receive processing section 32 includes a mechanism for detecting a predetermined preamble and can receive subsequent header information when receiving a preamble. Furthermore, there is provided a packet processing section 33 for carrying out data conversion of a signal received by the wireless transmit/receive processing section 32 and also data conversion of a signal to be transmitted by the wireless transmit/receive processing section 32.

Moreover, there is provided a unit processing section 34 for processing information of the received data converted by the packet processing section 33 by the predetermined data unit and for processing to divide a data payload for building a transmission packet in the packet processing section 33 by the predetermined unit.

Furthermore, the data divided into units by the unit processing section 34 is supplied to a connected device 39 through an interface section 35 and the data sent from the connected device 39 is supplied to the unit processing section 34 through the interface section 35, whereby the data can processed for be conversion.

In this example, the interface section 35 of the wireless transmitter can transmit and receive voice and video information or various data information to and from the connected device 39 through a high-speed serial bus 38 such as IEEE 1394 as an external interface. Alternatively, the wireless transmitters may be incorporated in the body of the connected device 39.

Moreover, each section of the wireless transmitter is arranged so that processings are executed under the control of a control section 36 formed by a microcomputer or the like.

In this case, if a signal received by the wireless transmit/receive processing section 32 is a control signal such as access control information, the received signal is sent to the control section 36 through the packet processing section 33 and the control section 36 sets each section into the state indicated by the received control signal.

Furthermore, an internal memory 37 is connected to the control section 36, and data required for communication control, the number of communicating stations forming the network, information about a method of utilizing a transmission path and the like are temporarily stored in the internal memory 37.

The transmitter 14 of the control station also supplies a synchronizing signal and an access control signal to be transmitter from the control section 36 to other transmitters 11 to 13 from the control section 36 to the wireless transmit/receive processing section 32 through the packet processing section 33 for wireless transmission.

In the control section 36 of the transmitter 11 to 13 other than the control station, if the received signal is the synchronizing signal, the control section 36 decides a reception timing of the synchronizing signal, sets a frame cycle based on the synchronizing signal, and executes the communication control processing in that frame cycle.

Furthermore, in the case where the received signal is the access control signal, a predetermined access control operation is carried out in the control section 36 through the packet processing section 33.

Figure 4:
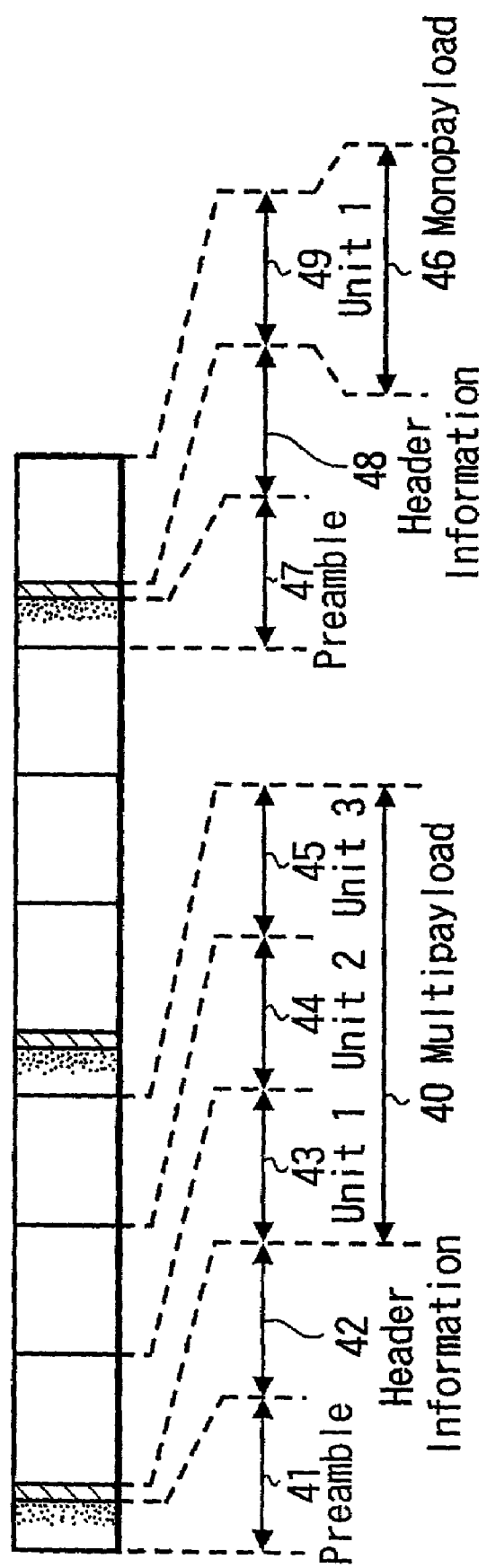
FIG. 4 is a diagram showing an example of the structure of a wireless transmission packet according to an embodiment of the present embodiment.

FIG. 4 is a diagram showing an example of the structure of a wireless transmission packet according to the present embodiment. FIG. 4 shows the structure of a transmission packet combining a multipayload packet with a monopayload packet.

From a left portion to a middle portion in FIG. 4, there is shown a multipayload packet having a multipayload 40 formed by three data units, unit (1) 43, unit (2) 44 and unit (3) 45. The right portion represents a monopayload packet formed by a monopayload 46 including one data unit (1) 49. The multipayload packet including the multipayload 40 is herein combined with the monopayload packet formed by the monopayload 46.

In this example, a preamble 41 and header information 42 are included in each multipayload packet having the multipayload 40. A preamble 47 and header information 48 are included for each monopayload packet formed by the monopayload 46.

In other words, putting them in order, the transmission packet can be built in such a manner that, the data payload portion is divided into a plurality of units information units, as a result of which, a plurality of preambles 41, 47 and a plurality of header information 42, 48 are added to a proper number of data units of unit (1) 43, unit (2) 44 and unit (3) 45 or the data unit (1) 49 in one transmission packet.

Figure 17:
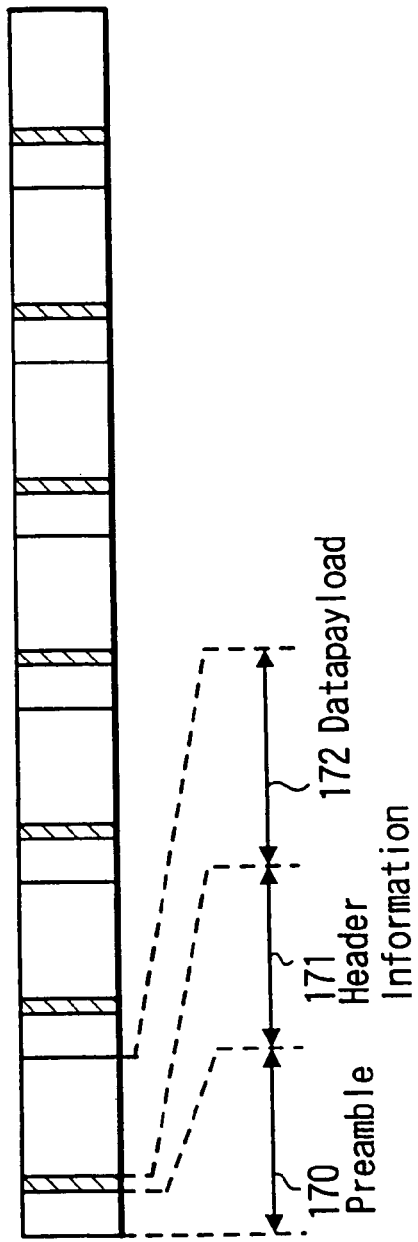
FIG. 17 is a diagram showing a first example of the structure of a wireless transmission packet according to the conventional method.
Figure 18:
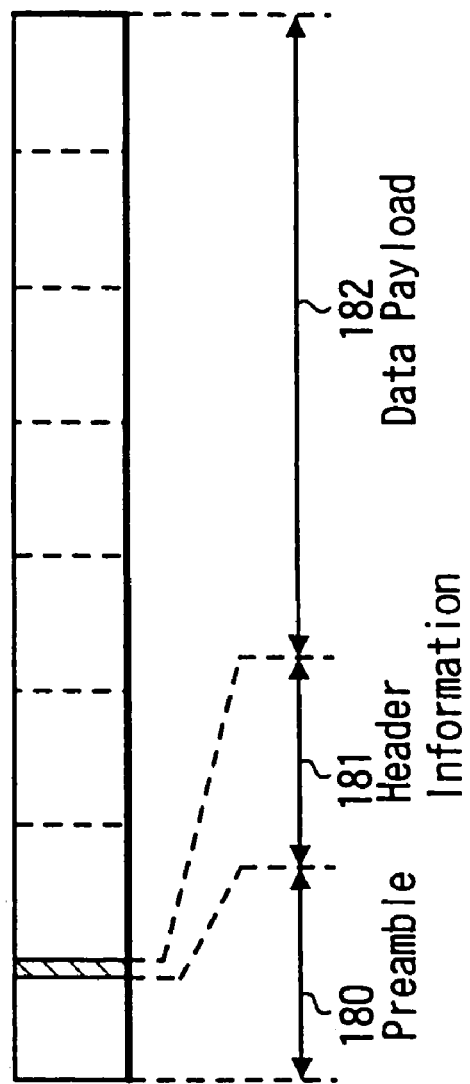
FIG. 18 is a diagram showing a second example of the structure of the wireless transmission packet according to the conventional method.

The structure of the wireless transmission packet shown in FIG. 4 is different from that of the conventional method shown in FIGS. 17 and 18 in that the multipayload packet including the multipayload 40 is combined with the monopayload packet formed by the monopayload 46 and the preambles 41, 47 and the header information 42, 48 are provided in each payload packet.

Figure 5:
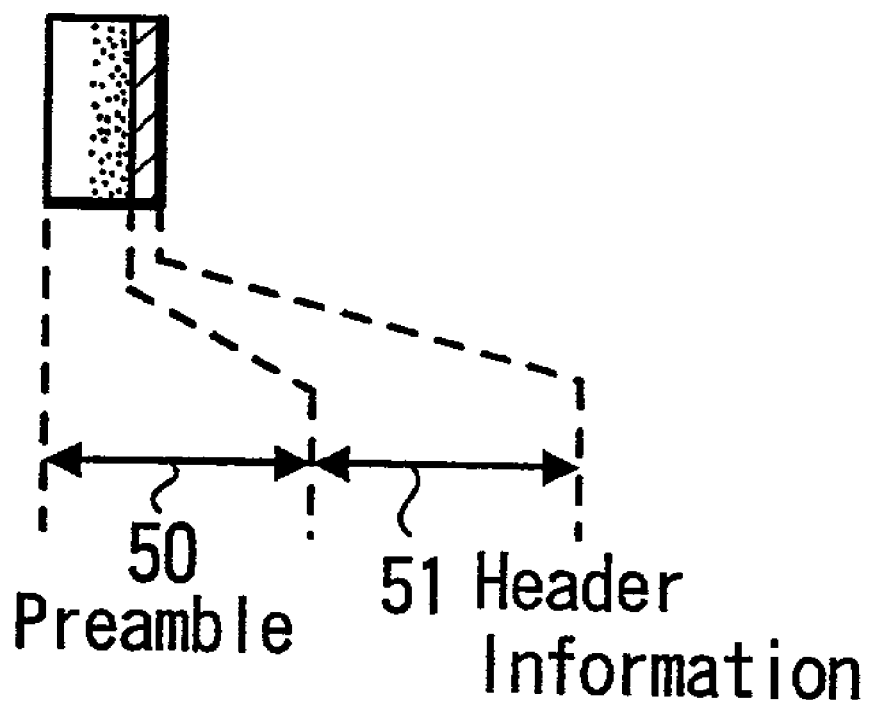
FIG. 5 is a diagram showing an example of the structure of an access control packet according to an embodiment of the present invention.

FIG. 5 is a diagram showing an example of the structure of an access control packet according to the present embodiment.

In this drawing, access control information and the like are included in header control information 51. The header control information 51 is also transmitted subsequently to a predetermined preamble 50. Therefore, it can be recognized that the control information will follow, so that the same reception processing as that of the aforesaid data payload packet can be carried out.

Figure 6:
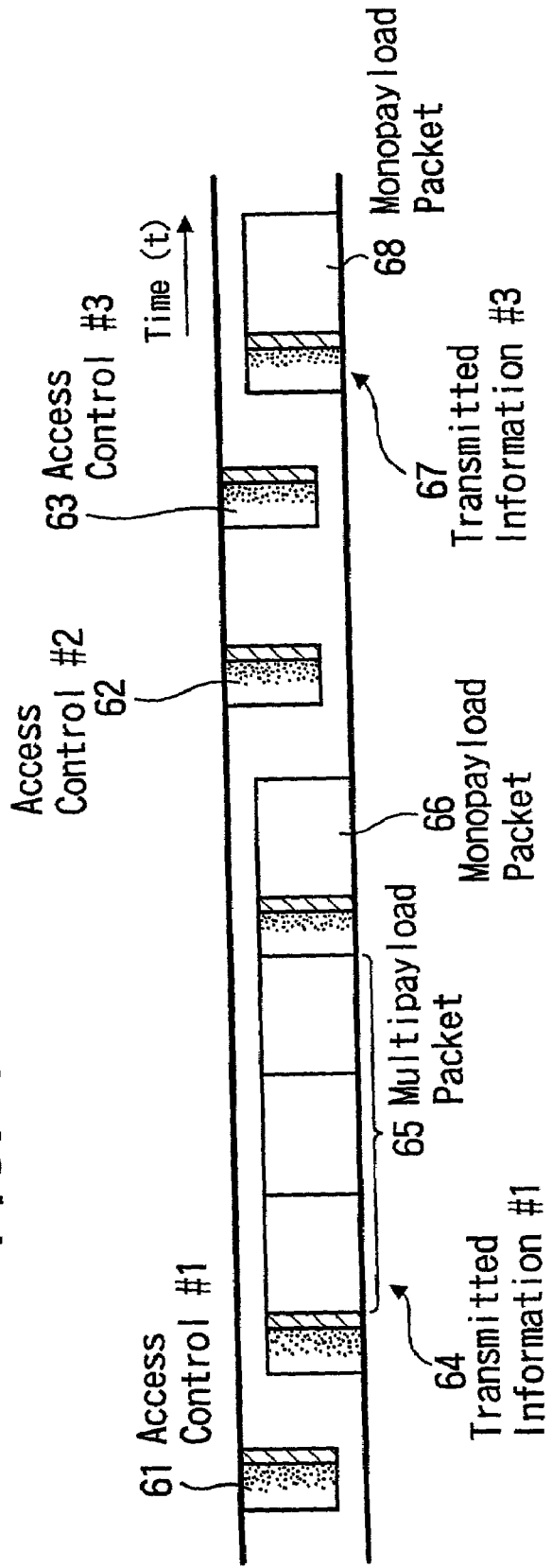
FIG. 6 is a diagram showing an example of access control according to an embodiment of the present invention.

FIG. 6 is a diagram showing an example of access control according to the present embodiment. FIG. 6 schematically shows transmission of access control information sent from the control station and information transmission by each wireless communicating station (#*).

In FIG. 6, access control information (#1) 61 is transmitted from the control station of the wireless network to a wireless communicating station (#1). In response thereto, the wireless communicating station (#1) transmits information using a transmission packet for transmitted information transmission (#1) 64 having a multipayload packet 65 and a monopayload packet 66.

After the information of the information transmission (#1) 64 is transmitted and the control station then detects the end of the transmitted information (#1) 64, access control information (#2) 62 is transmitted this time to a wireless communicating station (#2). However, the wireless communicating station (#2) having no information to be transmitted does not respond thereto.

Then, after the control station detects that the information transmission is not carried out, access control information (#3) 63 is transmitted this time to a wireless communicating station (#3). In response thereto, the wireless communicating station (#3) transmits information using the transmission packet for transmitted information (#3) 67 of only a monopayload packet 68.

Figure 7:
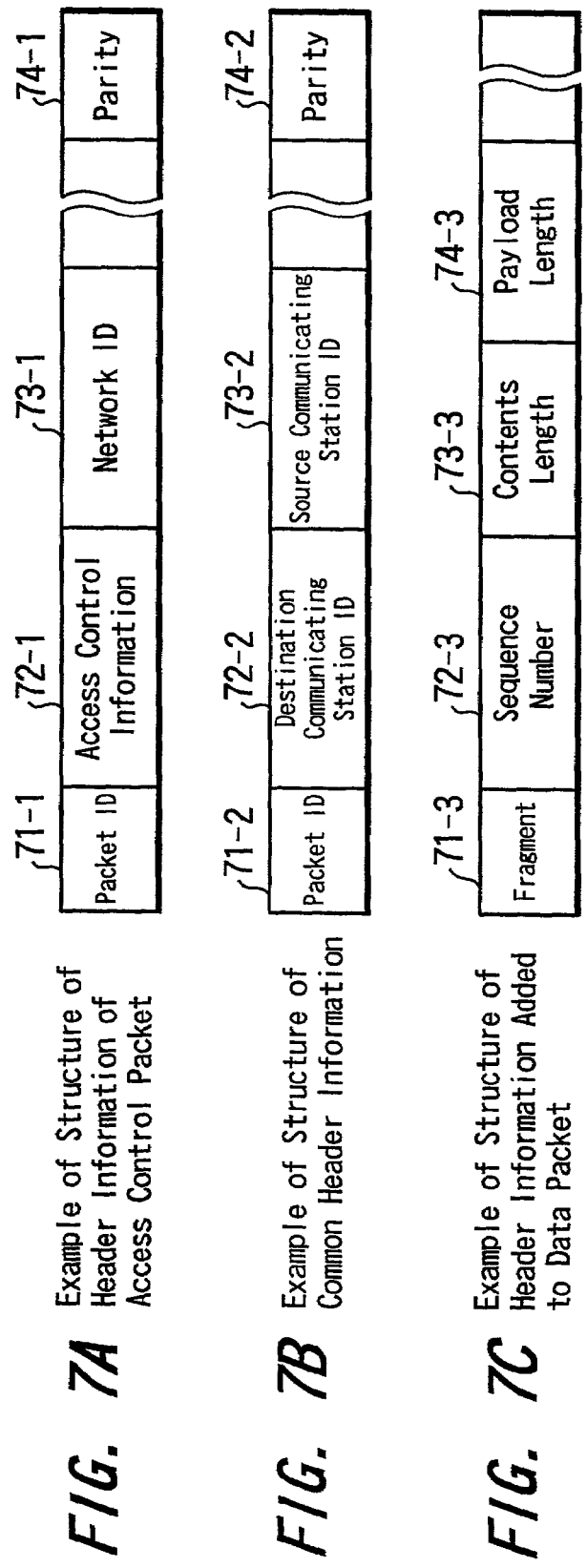
FIG. 7 is a diagram showing header information of a packet.

FIG. 7 is a diagram showing header information of a packet. FIG. 7 illustrates an example of the structure of header information to be utilized as the access control information.

FIG. 7A illustrates an example of the structure of header information to be utilized as access control information.

In FIG. 7A, packet ID information 71-1 is an identification code for identifying the type of packet according to the present embodiment described above. Access control information 72-1 serves to give a transmittal permission to a the relevant wireless communicating station. Furthermore, network ID information 73-1 serves to identify the relevant wireless network. A parity 74-1 required for detecting the presence of an error of these information is added if necessary. A checksum, a CRC (Cyclic Redundancy Check) code or the like may be added as the parity 74-1 for example.

FIG. 7B shows an example of the structure of minimum information required for common header information. The header information may be added at each time need arises.

In FIG. 7B, packet ID information 71-2 is an identification code for identifying the type of packet according to the present embodiment described above. Designated communicating station ID information 72-2 serves to indicate a designated communicating station of the relevant packet.

Further, source communicating station ID information 73-2 serves to indicate a source communicating station of the relevant packet. A parity 74-2 required for detecting the presence of an error of these information is added if necessary. A checksum, a CRC (Cyclic Redundancy Check) code or the like may be added as the parity 74-2 for example.

FIG. 7C illustrates an example of the structure of header information to be added to the data packet.

In this example, these information may be included in the data unit. Alternatively, these information may be included in the common header information described above. Concerning these structures, it will suffice that a part thereof is included in the common header information and the residual part is included in the data unit.

In FIG. 7C, fragment information 71-3 and sequence number 72-3 acting as the header information to be added to the data packet represent a divided state of division of the relevant packet. A contents length 73-3 is information indicative of the length of information having the contents. If necessary, payload length 74-3 and the like are further included as information of multipayload length.

Figure 8:
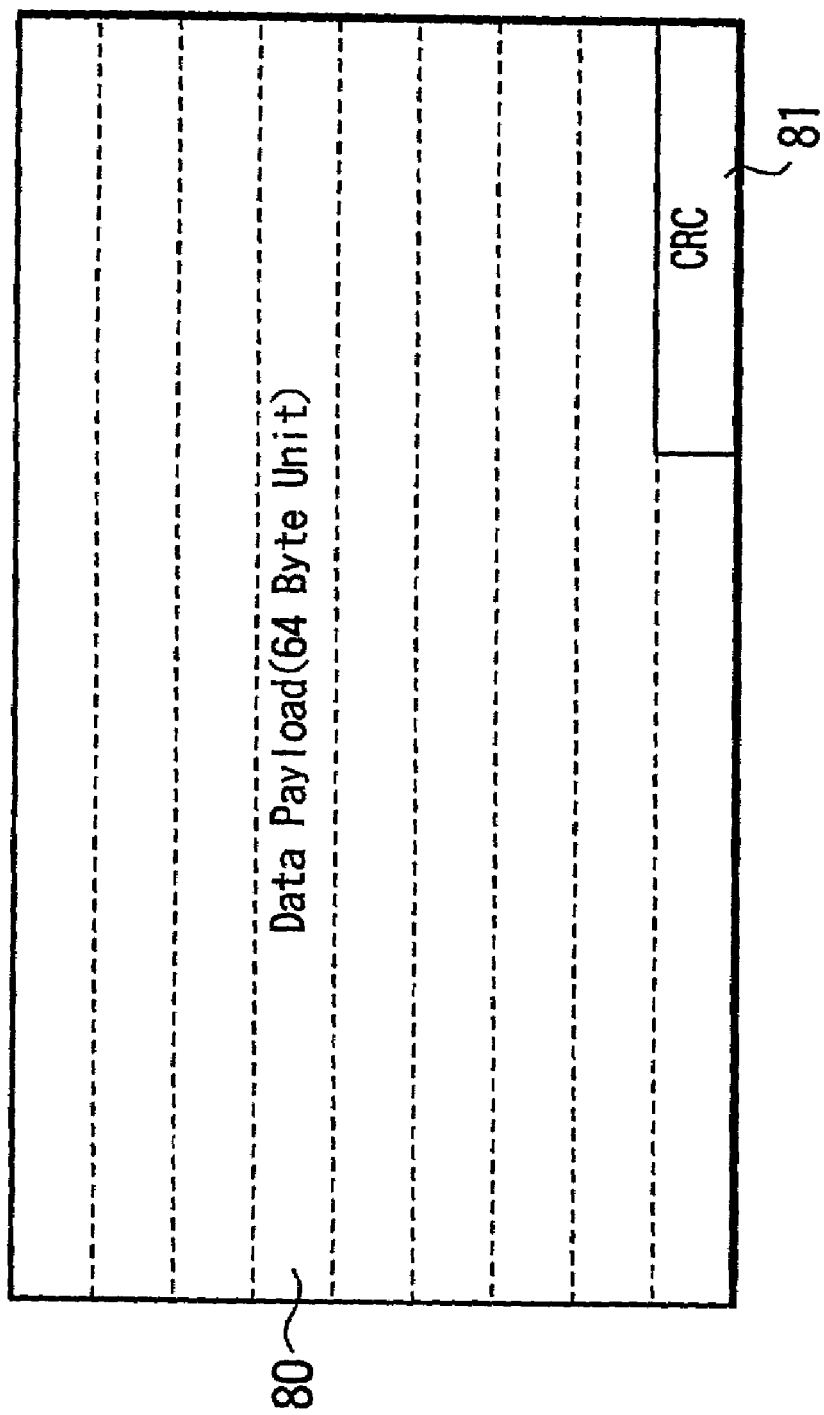
FIG. 8 is a diagram showing an example of the structure of a data unit.

FIG. 8 is a diagram showing an example of the structure of one data unit.

This illustrates that data payload of 64-bytes (Data Payload) 80 can be made to form one data unit for convenience.

In other words, there is such one unit in case of a monopayload packet, and there are a plurality of such units in case of a multipayload packet. They are combined into one transmission packet.

In FIG. 8, a CRC 81 or the like is added to the end of the data payload 80 forming the data unit so that error detection, error correction and the like can be carried out.

FIG. 9 shows an example of packet identification based on a packet ID included in the common header information. While a packet ID 92 is formed by 4-bit information (0000 to 0111) for convenience, the information may be increased or decreased as the occasion demands.

In the case of the packet ID92=0000, it represents that a packet use 90 is an access control packet and a packet name 91 is a non-payload packet in which no payload is not present. In this case, moreover, a packet contents 93 represents the header. This packet is used for control information and a network ID.

In the case of the packet ID92=0001, it represents that the packet use 90 represents a data packet and the packet name 91 is a monopayload packet in which a payload of one data unit is present. In this case, the packet contents 93 represents that one data unit is added to the header. This packet is used for a fragment, a sequence number and a contents length.

In the case of the packet ID92=0010 to 0110, they each represent that the packet use 90 is a data packet and the packet name 92 is a multipayload packet in which payloads of a plurality of data units are present. In this case, the packet contents 93 represents that two data units are added to the header for the packet ID92=0010; three data units are added to the header for the packet ID92=0011; four data units are added to the header for the packet ID92=0100; sixth data units are added to the header for the packet ID92=0101; and eight data units are added to the header for the packet ID92=0110. Each of these packets is used for a fragment, a sequence number and a contents length.

In the case of the packet ID92=0111, it represents that the packet use 90 is a data packet and the packet name 91 is a multipayload packet in which payloads of a plurality of data units are present. In this case, the packet contents 93 represents that N data units are added to the header. This packet is used for specifying the number of data units by referring to information about the length of payload.

Consequently, it is possible to identify the presence and the type of the payload included in the respective packets by referring to the packet ID.

Figure 10:
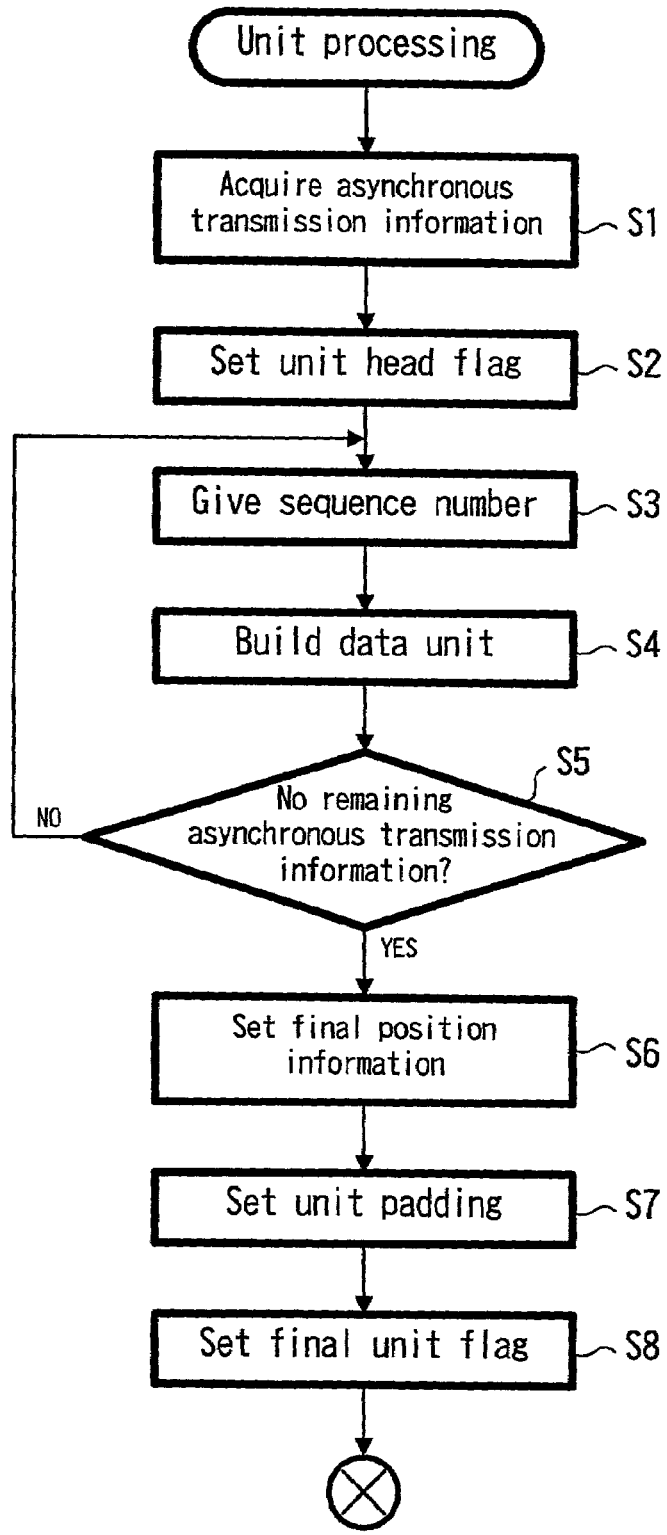
FIG. 10 is a flow chart showing an operation for unit processing.

FIG. 10 is a flow chart showing an example of an operation for carrying out the unit processing on asynchronous transmission information.

At Step S1, asynchronous transmission information to be transmitted by wireless is acquired first. At Step S2, a head flag is further set to the first unit. At Step S3, a sequence number is then given to the unit. At Step S4, the data units are built until a fixed unit quantity of data payload is reached.

At Step S5, residual of the asynchronous transmission information is decided. When the information is still present, processing returns to the Step S3 based on a branch of No and the processings are executed at the Steps S3 and S4 where the next sequence number is given and the next data unit is built.

When there is no more information at Step S5, processing proceeds to Step S6 through a branch of YES, where a final position of asynchronous information included in the relevant unit is described. At Step S7, the padding is provided on the remaining unit. At Step S8, a final unit flag is set. Thus, a series of unit processings finish.

Figure 11:
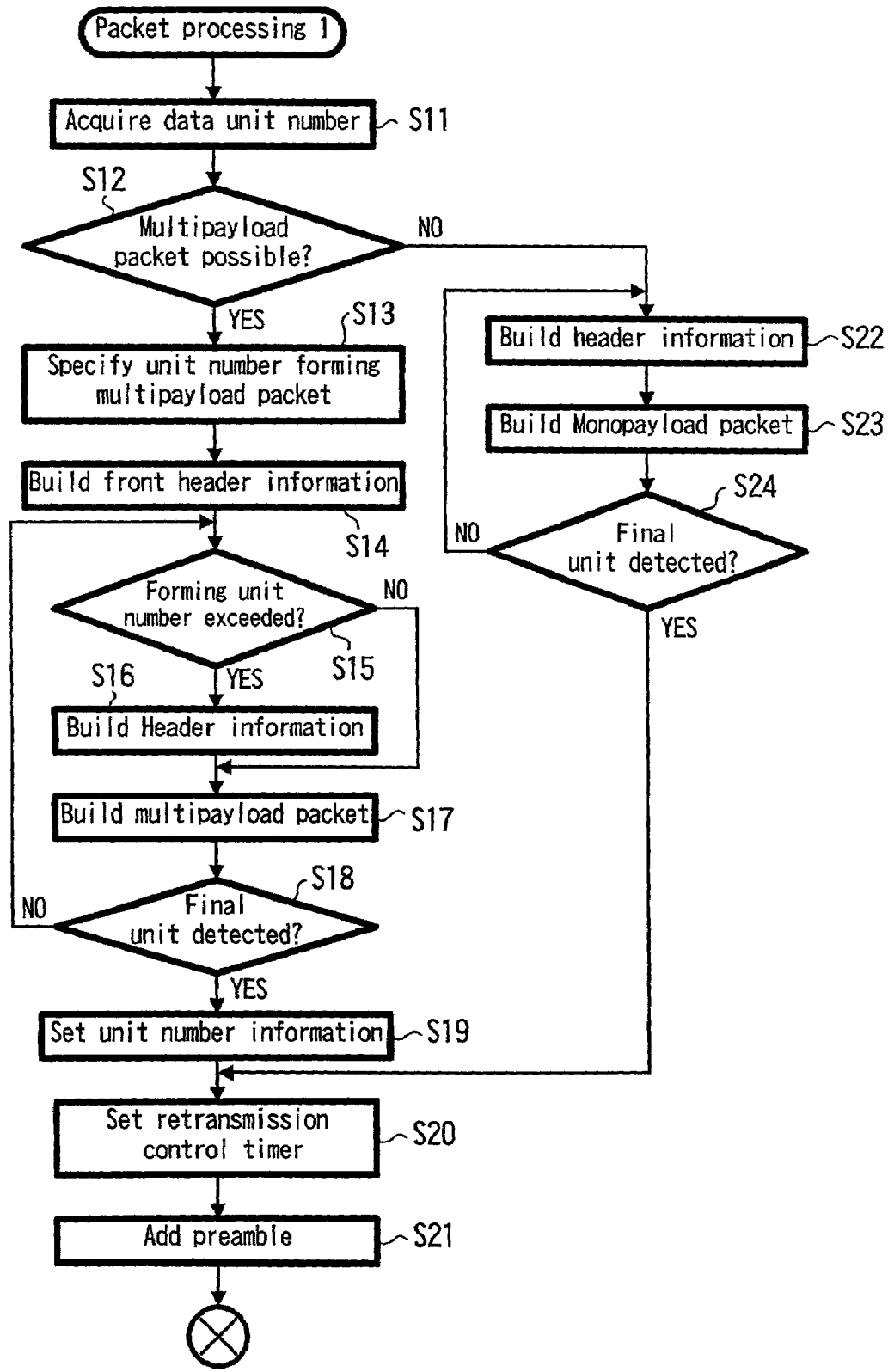
FIG. 11 is a flow chart showing a first operation for packet processing.

FIG. 11 is a flow chart showing a first packet processing operation for building a wireless transmission packet from the above-mentioned data unit.

At Step S11, first of all, the number of data units to be transmitted by wireless is acquired. At Step S12, it is decided whether or not packet transmission can be carried out by utilizing a multipayload packet.

If the multipayload packet can be used at Step S12, the number of units forming the multipayload packet is specified at Step S13 through a branch of YES.

At Step S14, head header information is built. At Step S15, it is decided whether the number of the forming units is exceeded or not. If the number of the forming units is exceeded, predetermined header information is added at Step S16. If the number is not exceeded, a multipayload packet is built at Step S17.

At Step S18, it is decided whether a final unit arrives or not. If the final unit does not arrive, the processing returns to the Step S15 through a branch of NO and the decision and processings are carried out at the Steps S15 to S17 and to build a packet again.

When the final unit arrives at the Step S18, unit number information included in the multipayload packet is set at Step S19.

At Step S20, a retransmission timer is set. At Step S21, a predetermined preamble is added before the packet header information to carry out wireless transmission by a prescribed access control method.

When transmission of the multipayload packet cannot be carried out at the Step S12, predetermined header information is added at Step S22 through a branch of NO and a monopayload packet is built at Step S23.

At Step S24, it is decided whether a final unit arrives or not. If the final unit does not arrive, processing returns to the Step S22 through a branch of NO and the processings are carried out at the Steps S22 and S23 to build a packet again.

When the final unit arrives at the Step S24, the processing proceeds to the Step S20 where the retransmission timer is set. At the Step S21, a predetermined preamble is added before the packet header information and wireless transmission is carried out by the prescribed access control method.

Figure 12:
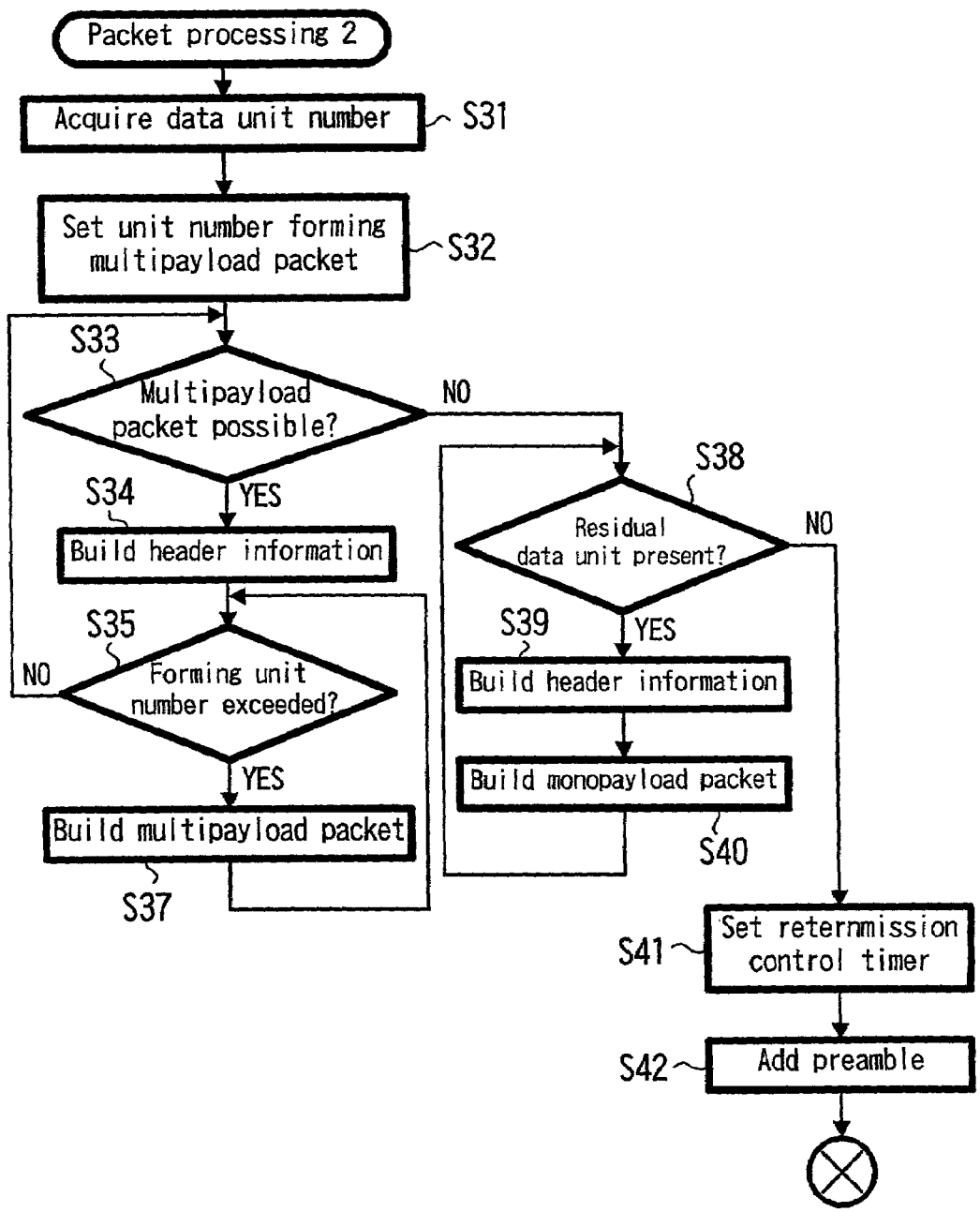
FIG. 12 is a flow chart showing a second operation for packet processing.

FIG. 12 is a flow chart showing a second packet processing operation for building a wireless transmission packet from the above-mentioned data unit.

At Step S31, first of all, the number of data units to transmitted by wireless is acquired. At Step S32, the number of units forming the multipayload packet is set.

At Step S33, it is decided whether the multipayload packet can be used or not. In other words, there is the number of wireless transmission data units equal to or greater than the number of the forming units, processing proceeds to Step S34 through a branch of YES where header information is built.

At Step S35, it is decided whether the number of units of units forming the multipayload packet is exceeded or not. If the number of the forming units is not exceeded, a multipayload packet is built at Step S37. Then, processing proceeds to Step S35 where it is decided again whether the number of the forming units is exceeded or not.

If the number of the forming units is exceeded at the Step S35, processing then proceeds to the Step S33 where it is decided again whether or not the multipayload packet can be utilized for the packet transmission.

If the number of residual units is too small the number of constituted units forming the multipayload packet and the multipayload packet cannot be used, at the Step S33, the presence of the residual data unit is decided at Step S38 through a branch of NO.

If there is any residual data unit at the Step S38, predetermined header information is added at Step S39 and a monopayload packet is built at Step S40. Then, processing proceeds to the Step S38 where the number of residual units is detected again.

When it is decided at the Step S38 that there is no data unit, the processing proceeds to Step S41 through a branch of NO, where the retransmission timer is set. At Step S42, a predetermined preamble is added before the packet header information to carry out the wireless transmission according to the prescribed access control method.

Figure 13:
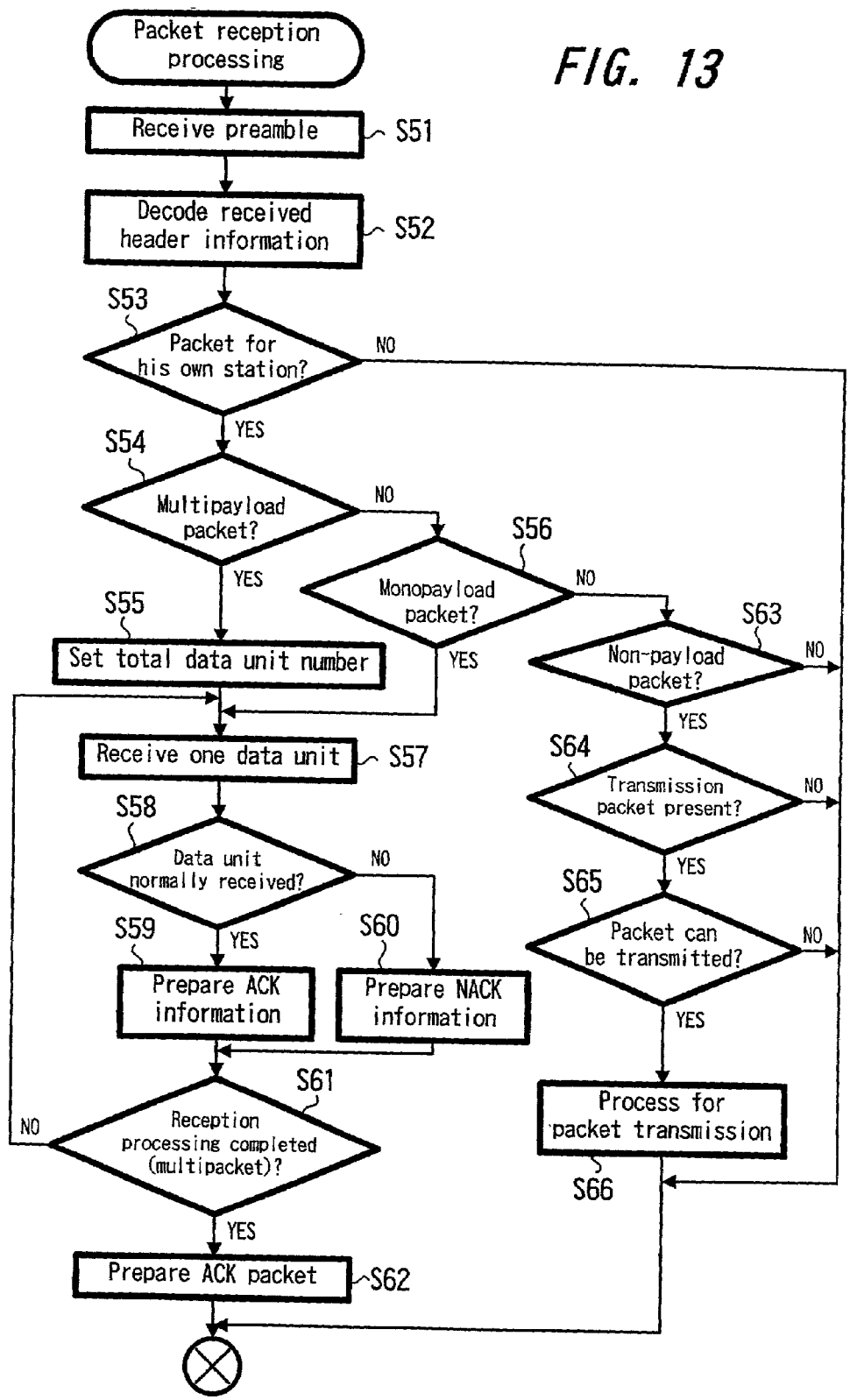
FIG. 13 is a flow chart showing an operation for packet reception processing.

FIG. 13 is a flow chart showing an operation for processing to receive a wireless transmission packet in a general communicating station.

At Step S51, a predetermined preamble is received first. At Step S52, header information is received to carry out a decoding processing.

At Step S53, it is decided whether a packet is sent for his own station or not. If the information is sent for his own station, the processing proceeds to Step S54 through a branch of YES, where it is decided whether the packet is a multipayload packet or not.

When it is decided that the packet is the multipayload packet based on the header information at the Step S54, information about total data unit number of a multipayload is acquired at Step S55 through a branch of YES and processing then proceeds to Step S57.

If the packet is not the multipayload packet at the Step S54, it is decided whether the packet is a monopayload packet or not at Step S56 through a branch of NO.

When it is decided that the packet is the monopayload packet based on the header information at the step S56, processing then proceeds to Step S57 through a branch of YES.

At Step S57, a processing to receive one data unit is carried out. At Step S58, it is decided whether the unit can be normally received or not. In this case, for example, it is conceivable that error detection is carried out by the CRC added to the end of the packet.

If the unit can be normally received at the Step S58, ACK (acknowledgement) information of the relevant data unit is prepared at Step S59. If the unit cannot be normally received, NACK (non-acknowledgement) information of the relevant data unit is prepared at Step S60.

At Step S61, it is decided whether or not the processing to receive all the data units forming the multipayload packet is completed. If the reception processing is not completed, processing proceeds to the Step S57 where the processing to receive the residual data unit is continued. When the processing to receive all the data units is completed, an ACK packet is then generated at Step S62.

Additionally, concerning the ACK packet, one ACK packet may be created for data which can be received in each frame cycle, for example. Alternatively, one ACK packet may be created for the received data (payload packet).

When it is decided at the Step S56 that the packet is not the monopayload packet, it is further decided whether or not the packet is a packet having no payload such as access control information.

When it is decided at the Step S63 that the packet is a non-payload based on the header information, the presence of a packet to be transmitted from his own station is decided at Step S64 through a branch of YES because it is access control information for his own station. If there is a transmission packet, it is decided whether the packet can be transmitted or not at Step S65 through a branch of YES. If the packet can be transmitted, the packet is transmitted at Step S66 through a branch of YES.

On the contrary, when there is no packet to be transmitted, or there is no sufficient information transmitting region for example, thus making the packet transmission impossible at the Step S64, no processing will be carried out through a branch of NO.

When it is decided that the packet is not the non-payload packet at the Step S63, there is a possibility that the packet may be one not defined by predetermined header information or the header information may have an error. Therefore, the reception processing is not carried out.

Figure 14:
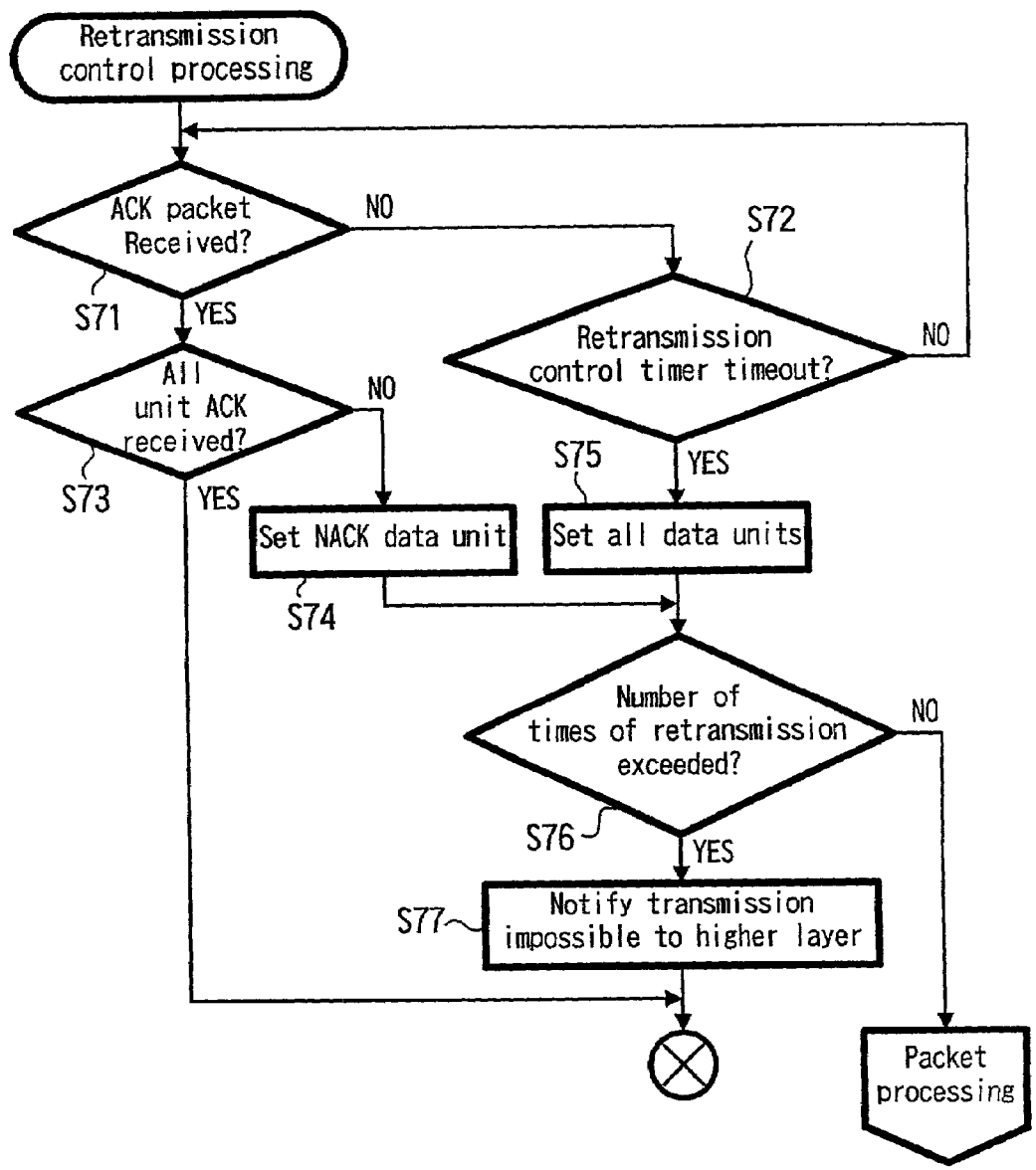
FIG. 14 is a flow chart showing an operation for a reproduction control processing.

FIG. 14 is a flowchart showing an operation for a retransmission control processing of a wireless transmission packet in a source communication station.

In the source communicating station transmitting information, the reception of the ACK packet is confirmed at Step S71 and the time-out of a retransmission control timer is confirmed at Step S72.

When the ACK packet is received from a destination communicating station in a predetermined time at the Step S71, it is ascertained whether the ACKs of all the units are received or not at Step S73 through a branch of YES.

If the ACK information of all the units are returned at the Step S73, a series of processings are omitted. When the NACK information is included, the retransmission of the NACK data unit is set at the Step S74.

When the ACK packet cannot be received from the destination communicating station in a predetermined time, all the data units are reset at Step S75 through a branch of YES at the Step S72.

After the retransmission is set, the number times of retransmissions is confirmed at Step S76. When the number of times of packet retransmissions of the relevant information exceeds a predetermined number of times or a time for which the retransmission is permitted is exceeded at Step S76, a notice indicating that the transmission cannot be carried out is given to a higher layer (cable environment) of the source communicating station at Step S77 through a branch of YES. Thus, a series of processings come to an end.

When the number of times of retransmissions does not reach the predetermined number of times of or the time for which the retransmission is permitted is not exceeded, the above-mentioned packet processing is applied through a branch of NO to build a retransmission packet and then the retransmission is carried out by the predetermined access control.

Figure 15:
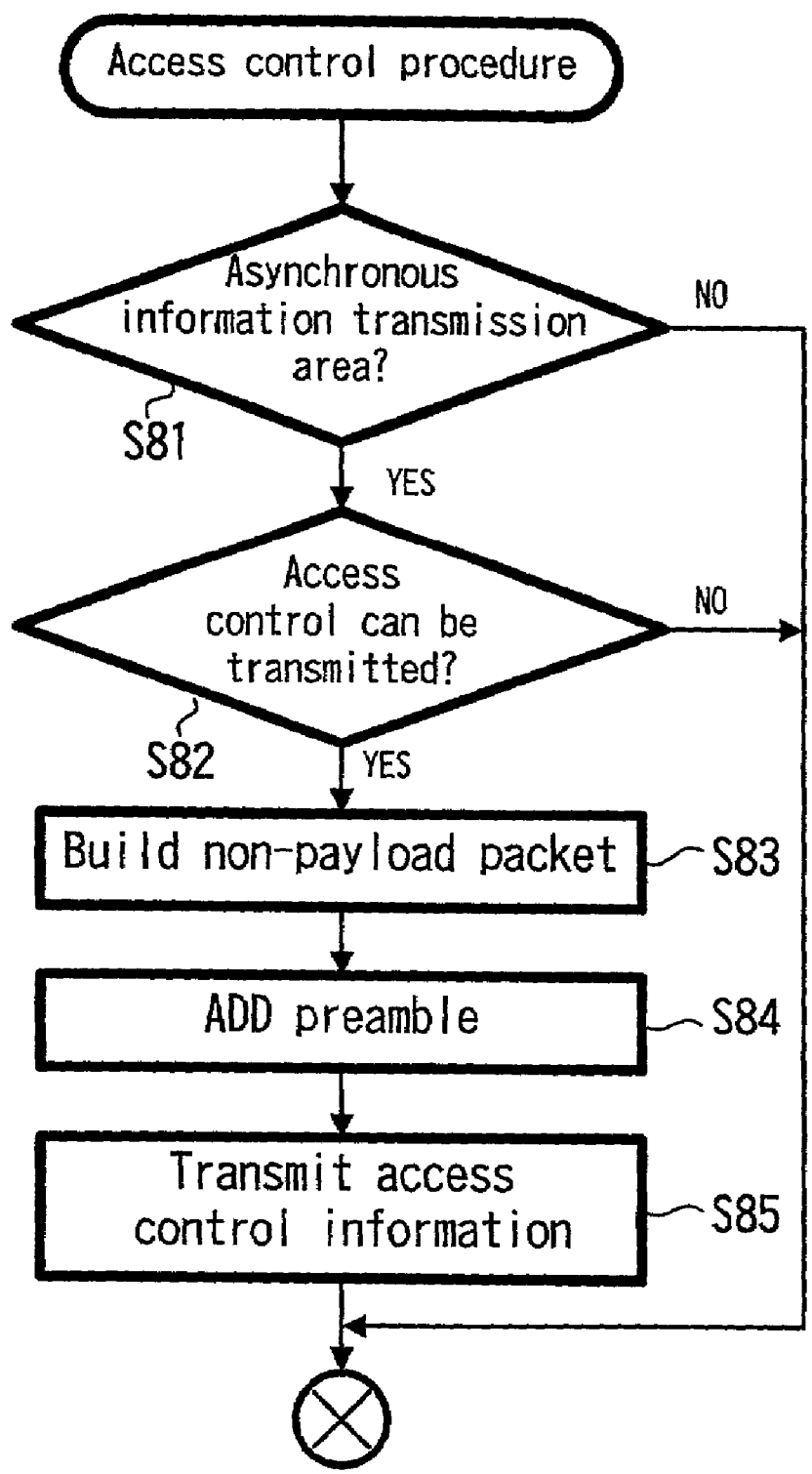
FIG. 15 is a flow chart showing an operation for access control processing.
Figure 16:
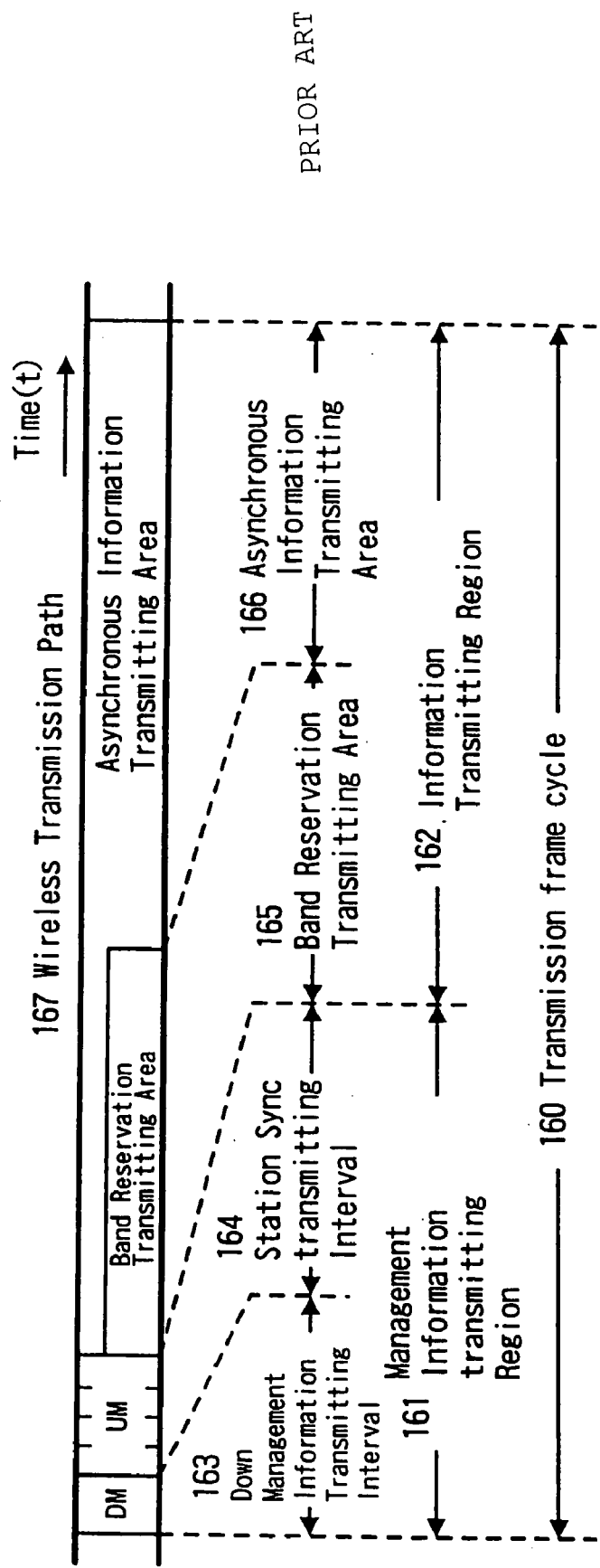
FIG. 16 is a diagram showing an example of the structure of a wireless transmission frame according to a conventional method.

FIG. 15 is a flow chart showing an operation for a control processing of access control information by a control station.

The control station ascertains whether or not it is in the asynchronous information transmitting area of a transmission frame cycle at Step S81. If it is in the asynchronous transmitting area, it is decided whether or not the access control information can be transmitted at Step S82.

When the information transmission is carried out by utilizing the same frequency band, for example, carrier sensing is performed so as to avoid mutual conflict wireless transmission of the other communicating station may not be disturbed.

When it is decided that a wireless transmission path is vacant at Step S82, a non-payload packet with only the header information is built was the access control information for a specific communicating station at Step S83. At Step S84, a predetermined preamble is added to make the access control information which is transmitted by wireless at Step S85.

The present invention provides a wireless transmitting method for forming a wireless network to carry out asynchronous transmission of information by using a plurality of communicating devices in which a monopayload packet having one of predetermined information units of the information as a data payload is built, a multipayload packet having a plurality of predetermined information units of the information as a data payload being built, and the asynchronous transmission by wireless packet obtained by optionally combining the monopayload packet with the multipayload packet depending on the length of the information to be asynchronously transmitted by wireless being carried out. Therefore, it is possible to obtain an advance that efficient asynchronous wireless transmission can be performed.

In the wireless transmitting method according to the present invention described above, a predetermined preamble is added to each packet of the monopayload packet and the multipayload packet to build a wireless packet. Therefore, it is possible to obtain the effect that the asynchronous wireless transmission packet can be received easily by the communicating station of the destination.

In the wireless transmitting method according to the present invention described above, common header information is added to the monopayload packet and the multipayload packet and the header information can be decoded to decide the state of succeeding data payload packets by a communicating station of destination. Therefore, it is possible to obtain an advantage that processing to analyze a data payload packet can be carried out easily by the communicating station of destination.

In the wireless transmitting method according to the present invention described above, the number of predetermined information units included in the multipayload packet is described as common header information in the payload packet so that the number of continuous information units can be specified. Therefore, it is possible to obtain an advantage that a processing to analyze the number of continuous information units can be carried out easily.

In the wireless transmitting method according to the present invention described above, a sequence number added to the monopayload packet and the multipayload packet is obtained by adding a number for each increase in the information unit included in the packet. Thus, it is possible to obtain an advantage that the transmission control can easily be carried out by the information unit.

In the wireless transmitting method according to the present invention described above, an error detection code or an error correction code is added to the monopayload packet and the multipayload packet in the information unit for transmission, and retransmission is required for each information unit having an error. Therefore, it is possible to obtain an advantage that efficient transmission can be carried out without the necessity of retransmitting all the information.

Moreover, the present invention provides a wireless transmitting method for carrying out information transmission between a plurality of communicating stations, in which wireless transmission control is carried out by an access control signal sent from a control station, and the access control signal is transmitted by wireless utilizing a wireless packet with only common header information having no data payload portion. Therefore, it is possible to obtain an advantage that the access control from a control station to each wireless communicating station can easily be carried out using the common header information.

In the wireless transmitting method according to the present invention described above, a predetermined preamble is added to each packet to build a wireless packet and the wireless transmission is carried out utilizing the packet. Therefore, it is possible to obtain an advantage that succeeding access control information can easily be received.

The present invention provides a wireless transmitter for forming a wireless network using a plurality of communicating devices to carry out asynchronous transmission of information, which comprises by dividing means for dividing asynchronous information to be transmitted by wireless into information units, monopayload packet building means for building a mono payload packet having one of predetermined information units as a data payload, multipayload packet building means for building a multipayload packet having a plurality of predetermined information units as a data payload, header adding means for adding header information describing the type of payload packet to the monopayload packet and the multipayload packet, and wireless packet building means for building a wireless packet by optionally combining the monopayload packet with the multipayload packet depending on the length of the asynchronous information to be transmitted by wireless, the asynchronous transmission being carried out by the wireless packet. Therefore, it is possible to produce the an advantage a wireless transmitter having an improved transmission efficiency can be obtained.

The wireless transmitter according to the present invention described above comprises preamble adding means for adding a predetermined preamble to the monopayload packet and multipayload packet, and access control means for carrying out wireless transmission control by using the preamble information by an access control signal sent from a control station, the wireless packet by wireless using the access control means. Therefore, it is possible to obtain an advantage that the reception of a receiving device of the asynchronous transmission packet can be facilitated out by adding the predetermined preamble to perform transmission.

The wireless transmitter according to the present invention described above comprises receiving means for receiving an access control signal sent from a control device of the wireless network, access control signal decoding means for decoding the access control signal, and deciding means that the access control signal is to be sent to his own station, and which starts to transmit a wireless packet by wireless using the deciding means. Therefore, it is possible to obtain an advantage that the transmission control can easily be carried out by the received access control signal.

The present invention provides a wireless transmitter for forming a wireless network using a plurality of communicating devices to carry out asynchronous transmission of information, which comprises receiving means for receiving a predetermined preamble, header decoding means for decoding header information added to the preamble, header analyzing means for deciding the presence of succeeding payload portions after the header information and the type of payload based on the header information, and payload decoding means for decoding the payload portion as asynchronous information. Therefore, it is possible to obtain an advantage that by receiving the predetermined preamble, decoding, the header information added thereto and deciding in the presence and type of succeeding payload portions after the header information easy decoding of the asynchronous information is enabled.

The present invention provides a wireless transmitter for forming a wireless network using a plurality of communicating devices to carry out asynchronous transmission of information, which comprises header building means for building header information based on an access control signal sent from a control station for carrying out wireless transmission control by the access control signal, access control packet building means for adding a predetermined preamble to the header information to build an access control packet, and carrier detecting means for detecting information transmitted on a wireless transmission path, and which transmits the access control packet depending on the state of the wireless transmission path. Therefore, it is possible to obtain an advantage that when it is decided that the wireless transmission path is vacant, it is enabled to build the header information for access control add the predetermined preamble to build the access control packet and transmit the access control packet.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A wireless transmitting method for forming a wireless network using a plurality of communicating devices to carry out asynchronous transmission of information, the method comprising the steps of:
    building a monopayload packet having one of predetermined information units of the information for transmission as a data payload,
    constituting a multipayload packet having a plurality of the predetermined information units of the information for transmission as a data payload,
    adding a predetermined preamble to form a monopayload wireless packet to the monopayload packet and to the multipayload packet to form a multipayload wireless packet,
    carrying out the asynchronous transmission by a wireless transmission packet obtained by combining the monopayload wireless packet with the multipayload wireless packet depending on a length of the information to be asynchronously transmitted by the wireless network,
    wherein when the wireless transmission packet is received and the first information unit is carried out, the reception and processing of subsequent information units is contingent on it being decided that the data payload should continue, and
    adding an error detection code or an error correction code to the monopayload packet and the multipayload packet by said information unit for transmission, whereby retransmission is required for each information unit having an error.

2. The wireless transmitting method according to claim 1, further comprising the steps of adding common header information to the monopayload packet and the multipayload packet and decoding the header information to make a state of succeeding data payload packets decidable by a communicating station of destination.

3. The wireless transmitting method according to claim 1, further comprising the step of describing a number of predetermined information units included in the multipayload packet as common header information in the multipayload packet so that the number of continuous information units is specified.

4. The wireless transmitting method according to claim 1, further comprising the step of adding a sequence number to the monopayload packet and obtaining the multipayload packet by adding the number for each increase in the information unit included in the packet.

5. A wireless transmitter for forming a wireless network to carry out asynchronous transmission of information by using a plurality of communicating devices, the transmitter comprising:
    dividing means for dividing the information for transmission by the wireless network into predetermined information units,
    monopayload packet building means for building a monopayload packet having one of the predetermined information units of the information for transmission as a data payload,
    multipayload packet building means for building a multipayload packet having a plurality of the predetermined information units of the information, for transmission as a data payload,
    header adding means for adding header information describing a type of payload packet to the monopayload packet and to the multipayload packet,
    wireless packet building means for building a wireless transmission packet by combining a wireless monopayload packet with a wireless multipayload packet depending on a length of the asynchronous information to be transmitted by the wireless network,
    preamble adding means for adding a predetermined preamble to the monopayload packet to form the monopayload wireless packet and to the multipayload packet to form the multipayload wireless packet,
    access control means for carrying out wireless transmission control using the preamble information by an access control signal sent from a control station, whereby the wireless transmission packet is transmitted by the wireless network using the access control means, wherein when the wireless transmission packet is received and the first information unit is carried out, the redemption and processing of subsequent information units is contingent on it being decided that the data payload should continue, and error adding means for adding an error detection code or an error correction code to the monopayload packet and the multipayload packet by said information unit for transmission, whereby retransmission is required for each information unit having an error.

6. The wireless transmitter according to claim 5, further comprising receiving means for receiving an access control signal sent from a control device of the wireless network, access control signal decoding means for decoding the access control signal, and deciding means for deciding that the relevant access control signal is for its own station, whereby the wireless transmission of the wireless packet is started using the deciding means.

* * * * *